United States Patent
Bratec et al.

(10) Patent No.: US 9,511,746 B2
(45) Date of Patent: Dec. 6, 2016

(54) WIPER BLADE

(75) Inventors: Hervé Bratec, Wilsele (BE); Guido Tuyls, Bunsbeek (BE); Johan Camps, Bunsbeek (BE); Christian Wilms, Beringen-Koersel (BE)

(73) Assignee: Robert Bosch GmbH, Stuttgart (DE)

( * ) Notice: Subject to any disclaimer, the term of this patent is extended or adjusted under 35 U.S.C. 154(b) by 746 days.

(21) Appl. No.: 13/976,135

(22) PCT Filed: Oct. 17, 2011

(86) PCT No.: PCT/EP2011/068102
§ 371 (c)(1),
(2), (4) Date: Oct. 1, 2013

(87) PCT Pub. No.: WO2012/069258
PCT Pub. Date: May 31, 2012

(65) Prior Publication Data
US 2014/0230178 A1    Aug. 21, 2014

(30) Foreign Application Priority Data
Nov. 24, 2010   (DE) .......................... 10 2010 061 822

(51) Int. Cl.
*B60S 1/38*   (2006.01)
*B60S 1/40*   (2006.01)

(52) U.S. Cl.
CPC .............. *B60S 1/3881* (2013.01); *B60S 1/381* (2013.01); *B60S 1/3849* (2013.01); *B60S 1/3863* (2013.01); *B60S 1/3806* (2013.01); *B60S 1/3808* (2013.01); *B60S 1/3879* (2013.01)

(58) Field of Classification Search
CPC .... B60S 1/3806; B60S 1/3808; B60S 1/381; B60S 1/3812; B60S 1/3813; B60S 1/3881; B60S 1/3879; B60S 1/3863
USPC ......... 15/250.201, 250.43, 250.361, 250.451
See application file for complete search history.

(56) References Cited

U.S. PATENT DOCUMENTS

| 5,946,764 A | * | 9/1999 | Tworzydlo | ............ | B60S 1/3806 |
| | | | | | 15/250.201 |
| 2007/0174989 A1 | * | 8/2007 | Moll | ........................ | B60S 1/38 |
| | | | | | 15/250.201 |

(Continued)

FOREIGN PATENT DOCUMENTS

| CN | 1784326 | 6/2006 |
| DE | 19856300 | 6/2000 |

(Continued)

OTHER PUBLICATIONS

International Search Report for Application No. PCT/EP2011/068102 dated Dec. 29, 2012 (3 pages).

*Primary Examiner* — Michael Jennings
(74) *Attorney, Agent, or Firm* — Michael Best & Friedrich LLP

(57) ABSTRACT

The invention relates to a wiper blade (10) designed as a flat bar with a wiper strip (12) which is held by a spring-elastic strip support element (14) that is pre-curved in a concave manner with respect to a wiper lip (16) of the wiper strip (12). One or more spoiler parts (22, 23) are attached to the support element (14) face facing away from the wiper lip (16) by means of guiding profiles (30) which cover the support element (14) from the outer longitudinal faces and project to a certain extent with respect to the outflow side (26) of the spoiler part (22, 23) and which form a groove (31) with said outflow side. A connecting element (18, 64) is fixed in the central region of the wiper blade (10) for connecting a wiper arm in an articulated manner. According to the invention, the guiding profile (30) on the outflow side (26) has a guiding ridge (32, 34, 40) on the guiding profile longitudinal face pointing outwards.

13 Claims, 9 Drawing Sheets

(56) References Cited

U.S. PATENT DOCUMENTS

| | | | |
|---|---|---|---|
| 2008/0148509 A1* | 6/2008 | Bacarella | B60S 1/3806 15/250.32 |
| 2008/0150193 A1* | 6/2008 | Walworth | B29C 33/76 264/310 |
| 2009/0007364 A1* | 1/2009 | Jarasson | B60S 1/386 15/250.32 |
| 2010/0000041 A1* | 1/2010 | Boland | B60S 1/3868 15/250.32 |
| 2010/0005608 A1* | 1/2010 | Chien | B60S 1/381 15/250.32 |
| 2010/0139026 A1* | 6/2010 | Ku | B60S 1/381 15/250.201 |
| 2010/0218332 A1* | 9/2010 | Stankiewicz | B60S 1/381 15/250.201 |
| 2011/0056041 A1* | 3/2011 | Wu | B60S 1/3858 15/250.32 |
| 2011/0277265 A1* | 11/2011 | Ehde | B60S 1/4038 15/250.32 |

FOREIGN PATENT DOCUMENTS

| | | |
|---|---|---|
| DE | 102005050569 | 4/2007 |
| EP | 2177406 | 4/2010 |
| FR | 2530562 | 1/1984 |
| FR | 2911834 | 8/2008 |
| FR | 2923785 | 5/2009 |
| KR | 20020016153 | 3/2002 |
| KR | 1020080011166 | 1/2008 |
| KR | 1020080020587 | 3/2008 |
| KR | 1020080059225 | 6/2008 |
| RU | 2008151723 A | 7/2010 |
| WO | 2010006776 | 1/2010 |
| WO | 2011101062 | 8/2011 |

* cited by examiner

WIPER BLADE

BACKGROUND OF THE INVENTION

The invention relates to a wiper blade.

DE 100 44 913 A1 discloses a wiper blade of flat bar construction for cleaning windows, in particular of motor vehicles, wherein a wiper strip with a wiper lip is held by means of a carrier element in the form of two spring rails running parallel to one another in a plane. The spring rails are inserted into two longitudinal grooves, which are separated from one another by a web, in longitudinal grooves of a head strip of the wiper strip. In order that the wiper strip can follow the curvatures of a vehicle window, the elastic spring rails are pre-curved in a concave manner toward the wiper lip, such that the wiper strip, in the unloaded state, bears only with its ends against the vehicle window. The wiper strips protrude to a small extent laterally out of the longitudinal grooves, such that an attachment element for the articulated connection of the wiper blade to a wiper arm can be fastened to the protruding parts of the spring rails in the central region of the wiper blade. To both sides of the attachment element in the longitudinal direction, spoiler parts are guided likewise on the protruding parts of the spring rails by means of guide profiles, the latter being adjoined, on a flow impingement side, by a flow impingement surface which, together with a limb on the flow-off side of the spoiler part, forms a substantially triangular cross section. The guide profile on the flow-off side protrudes to a small extent laterally in relation to the limb on the flow-off side, and forms a fillet with the latter at the cut edge. At the ends of the wiper blade, the spoiler parts are covered by end caps which are likewise guided on the carrier element.

DE 101 20 467 A1 discloses a similar wiper blade which, in addition to an embodiment of the carrier element with two elastic spring rails running parallel to one another, presents an embodiment of the carrier element with only one spring rail, said spring rail being accommodated in a longitudinal channel of a head strip of the wiper strip. The spoiler parts are integrally formed on said spring rail. Here, too, on the flow-off side of the spoiler parts, fillets are formed between said spoiler parts and the adjoining guide profiles.

SUMMARY OF THE INVENTION

According to the invention, the guide profile on the flow-off side has, on its outwardly pointing longitudinal side, a guiding rib. During the upward movement during the operation of the wiper blade, owing to the aerodynamic conditions, water flows along the drive-side, inner spoiler part in the direction of the attachment element, where said water collects owing to vortices. While the vehicle is travelling and during the downward movement of the wiper blade, in the prior art, the collected water passes as spray mist and water droplets onto the vehicle window, whereby the wiping quality is impaired. By means of the measures according to the invention, it is intended to prevent water from collecting in the region of the attachment element owing to vortices and from being able to pass, as spray mist or droplets, onto the vehicle window during the downward movement of the wiper blade. This is realized by means of the guiding rib according to the invention in the various embodiments of the invention.

Depending on the flow conditions on the vehicle, the guiding rib may extend over the entire length of the wiper blade or may be arranged only at one or more critical positions. In one embodiment of the invention, in which two spoiler parts are provided, of which an inner spoiler part extends from an inner end of the wiper blade to the attachment element whereas an outer spoiler part extends from an outer end to the attachment element, it is proposed that one or both spoiler parts has in each case a guide profile with a guiding rib. Regardless of whether the inner or outer spoiler part has a guiding rib, it may be advantageous for said guiding rib to be lengthened across the region of the attachment element such that the water cannot drip onto the vehicle window in said region.

If both spoiler parts have guiding ribs on the guide profiles on the flow-off side, it is expedient for at least one of the guiding ribs to be lengthened in the region of the attachment element. Furthermore, it is expedient for the top sides of the guiding ribs to terminate flush with the top sides of the guide profiles.

In some cases, it may suffice for measures for preventing water from dripping onto the vehicle window to be provided only in the region of the attachment element. Said measures may be used on their own or in conjunction with the guiding ribs on the spoiler parts. For example, in a region extending across the attachment element, a connecting piece may form a guiding rib which, via transitions, adjoins the guide profiles of the spoiler parts or the guiding ribs of the spoiler parts. Such a guiding rib may, in a further refinement of the invention, be formed by a connecting strip which, in the longitudinal direction to both sides of the attachment element, and by way of retention elements, is hooked onto the spoiler parts, wherein the connecting strip adjoins the associated guide profiles or the guiding ribs of the guide profiles. Here, in a further refinement of the invention, the retention elements may be in the form of attachment profiles for the adjoining spoiler parts. The attachment profiles with transition profiles integrally formed thereon at least partially cover the attachment element in the upward direction.

A further solution consists in the attachment element being guided, by way of guide profiles, on the carrier element, wherein the guide profile provided on the flow-off side is lengthened in the longitudinal direction in relation to the guide profile provided on the flow impingement side and has, on its outer longitudinal side, a skirt which points towards the wiper lip. As a result of the lengthened guide profile with its skirt, the flow in the region of the attachment element is conducted over the critical location, such that turbulence is substantially prevented.

In a further refinement of the invention, on the flow-off side, above the guide profiles, and at least on one side of the attachment element in the longitudinal direction, a filler piece is provided which, by way of a transition, adjoins the flow-off side of the associated spoiler part and extends as far as the longitudinal-side delimitation of the associated guide profile or of the associated guiding rib. The filler piece or the filler pieces have the effect that, in said critical regions, water is prevented from collecting, or vortices which effect such a water accumulation and thus spray water onto the vehicle window are prevented from forming. The flow in said critical regions may likewise be favorably influenced by means of webs which, in a further refinement of the invention, are integrally formed on the guide profiles on the flow-off side. The webs are arranged spaced apart from one another in the longitudinal direction of the wiper blade and run approximately perpendicular to the vehicle window. Here, the spacings of the webs may differ and may be varied according to the application. It is likewise possible for the number of webs and the inclination thereof with respect to the vehicle window to be adapted to the usage conditions.

BRIEF DESCRIPTION OF THE DRAWINGS

Further advantages will emerge from the following description of the drawing. The drawing illustrates exemplary embodiments of the invention. The drawing, the description and the claims contain numerous features in combination. A person skilled in the art will expediently also consider the features individually and combine them to form further meaningful combinations. In the drawing:

DETAILED DESCRIPTION

Figure 1:
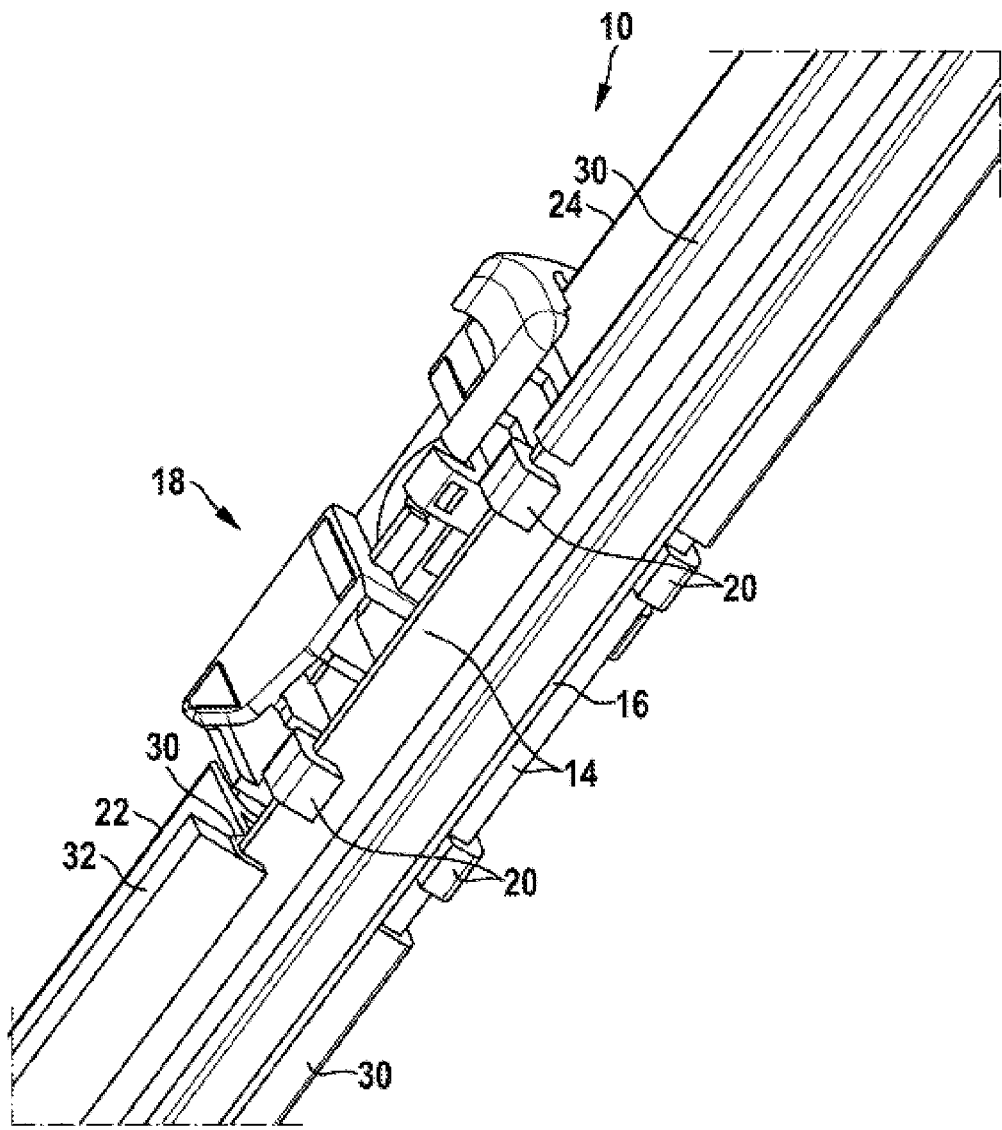
FIG. 1 shows a perspective partial view from below of a wiper blade according to the invention in the region of an attachment element.

In the case of a wiper blade 10, a wiper strip 12 is held by a carrier element 14 in the form of two spring rails which run parallel to one another in a plane. The carrier element 14 is pre-curved elastically and in a concave manner with respect to a wiper lip 16 of the wiper strip 12, wherein the curvature is more pronounced than the most pronounced curvature of a vehicle window 17 for which the wiper blade 10 is provided. The carrier element 14 may be manufactured from a spring steel or from a suitable plastic.

Instead of two spring rails, the carrier element 14 may also be composed of one spring rail which is accommodated in a longitudinal channel (not illustrated) of the wiper strip 12. In the central region of the wiper blade 10, an attachment element 18 is fastened to the carrier element 14 in a suitable manner, for example by means of claws 20 which laterally enclose the carrier element 14.

To both sides of the attachment element 18 in the longitudinal direction of the wiper blade 10, spoiler parts 22, 24 are guided, by way of guide profiles 30, on the outer edge regions of the carrier element 14. The guide profiles 30 form a fillet 31 with the flow-off side 28 of the spoiler parts 22, 24. The inner spoiler part, which is situated closer to the drive of the wiper blade 10, is denoted by the reference sign 22, whereas the other, outer spoiler part is denoted by the reference sign 24. The ends of the spoiler parts 22, 24 are covered by end caps 38 which are fastened to the carrier element 14. The spoiler parts 22, 24 have in each case a flow impingement side 26, which is impinged on substantially by the relative wind of the vehicle, whereas the other longitudinal side of the spoiler parts 22, 24 is referred to as flow-off side 28.

During an upward movement of the wiper blade 10, water flows to the attachment element 18 and collects there, and is sprayed, and passes on to the vehicle window, during a downward movement. To prevent this, guiding ribs 32 are provided on the guide profiles 30 on the flow-off side of the spoiler parts 22 and 24, which guiding ribs protrude laterally beyond the longitudinal sides of the guide profiles 30, and the top sides of which guiding ribs terminate flush with the top sides of the guide profiles 30. In the exemplary embodiments, the guiding ribs 32 extend from the end caps 38 to the attachment element 18. In the exemplary embodiment of FIG. 3, the guiding rib 32 is lengthened across a region 36 of the attachment element 18. Depending on the application, the guiding ribs 32 and 34 may also be shorter. The guiding ribs 32, 34 have the effect that, in the region of the attachment element 18, no vortices form which lead to water accumulations and which, during the downward movement of the wiper blade 10, spray the accumulated water onto the vehicle window 17.

Figure 2:
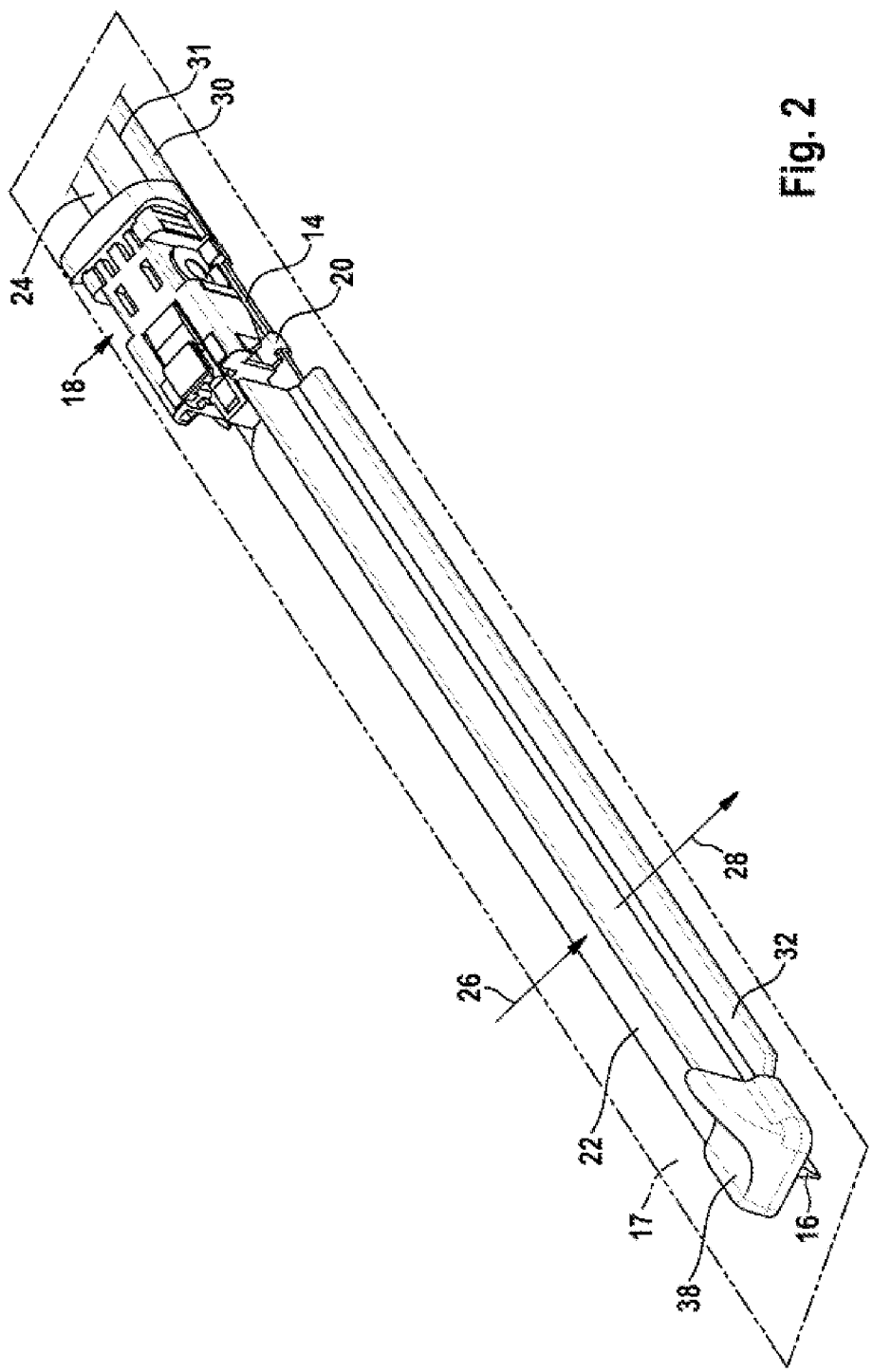
FIG. 2 shows a perspective partial view from above of an inner end of a wiper blade according to the invention as per FIG. 1.
Figure 3:
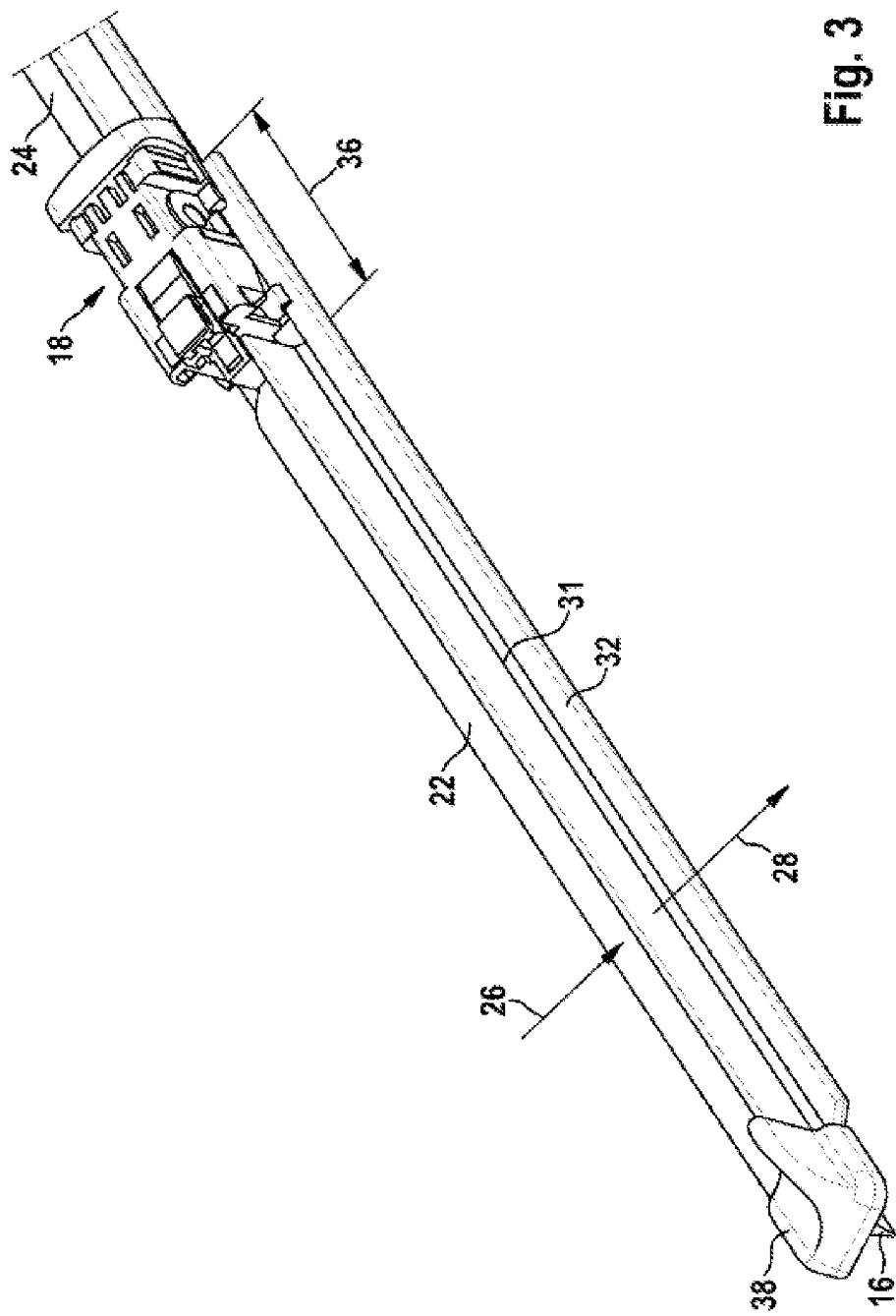
FIG. 3 shows a variant in relation to FIG. 2.
Figure 4:
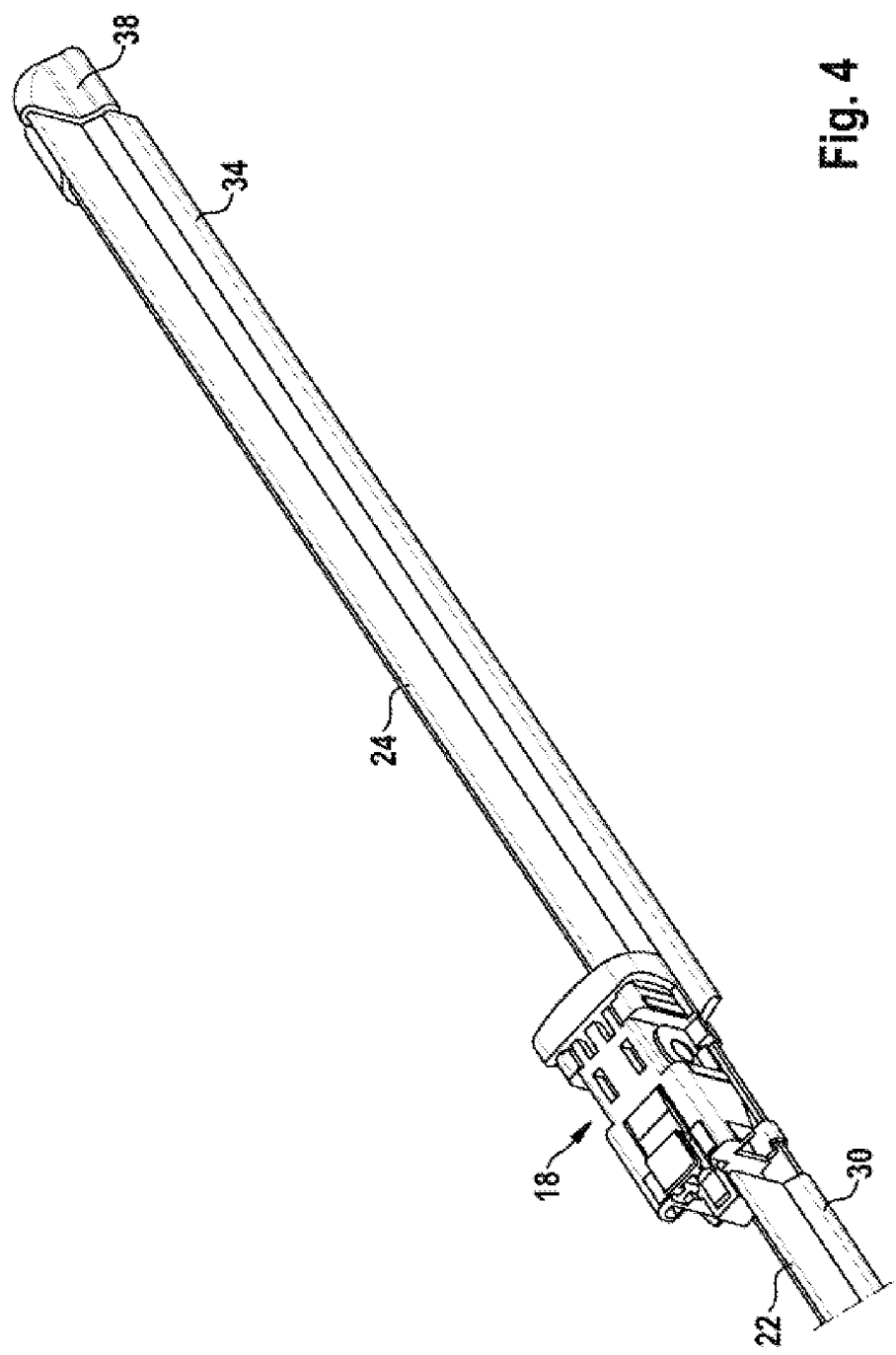
FIG. 4 shows a perspective partial view from above of an outer end of a wiper blade according to the invention as per FIG. 1.
Figure 5:
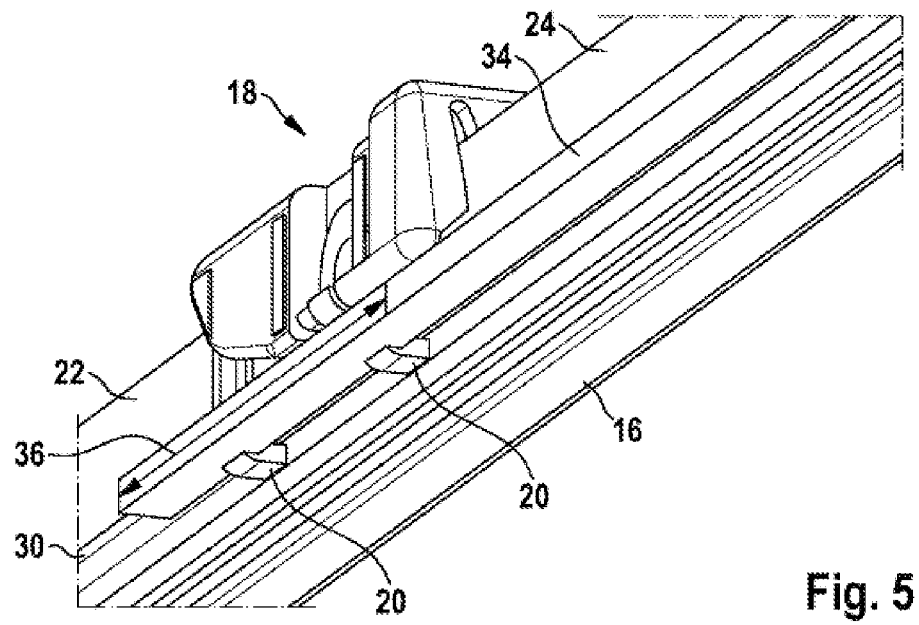
FIG. 5 shows a variant in relation to FIG. 1.
Figure 6:
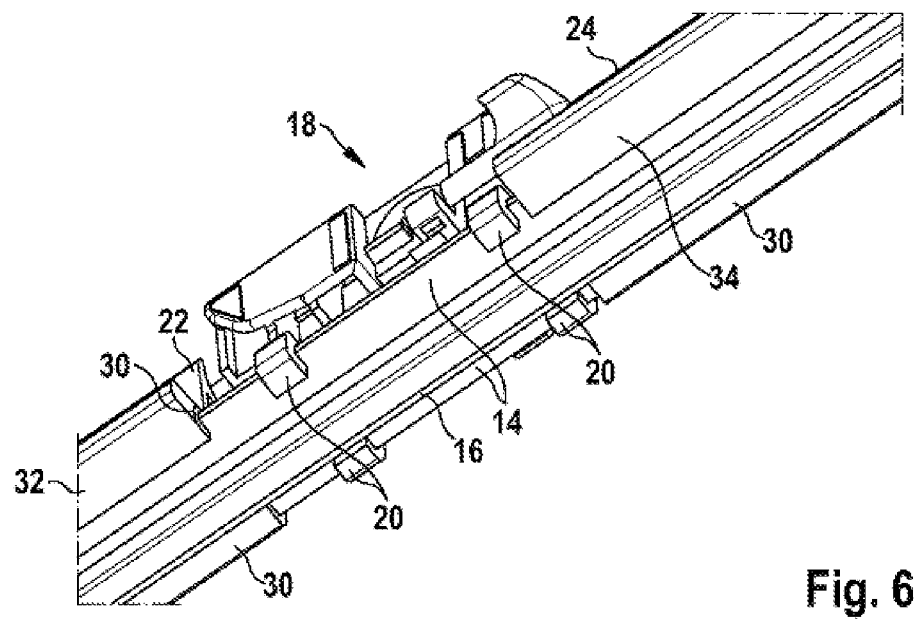
FIG. 6 shows a further variant in relation to FIG. 1.
Figure 7:
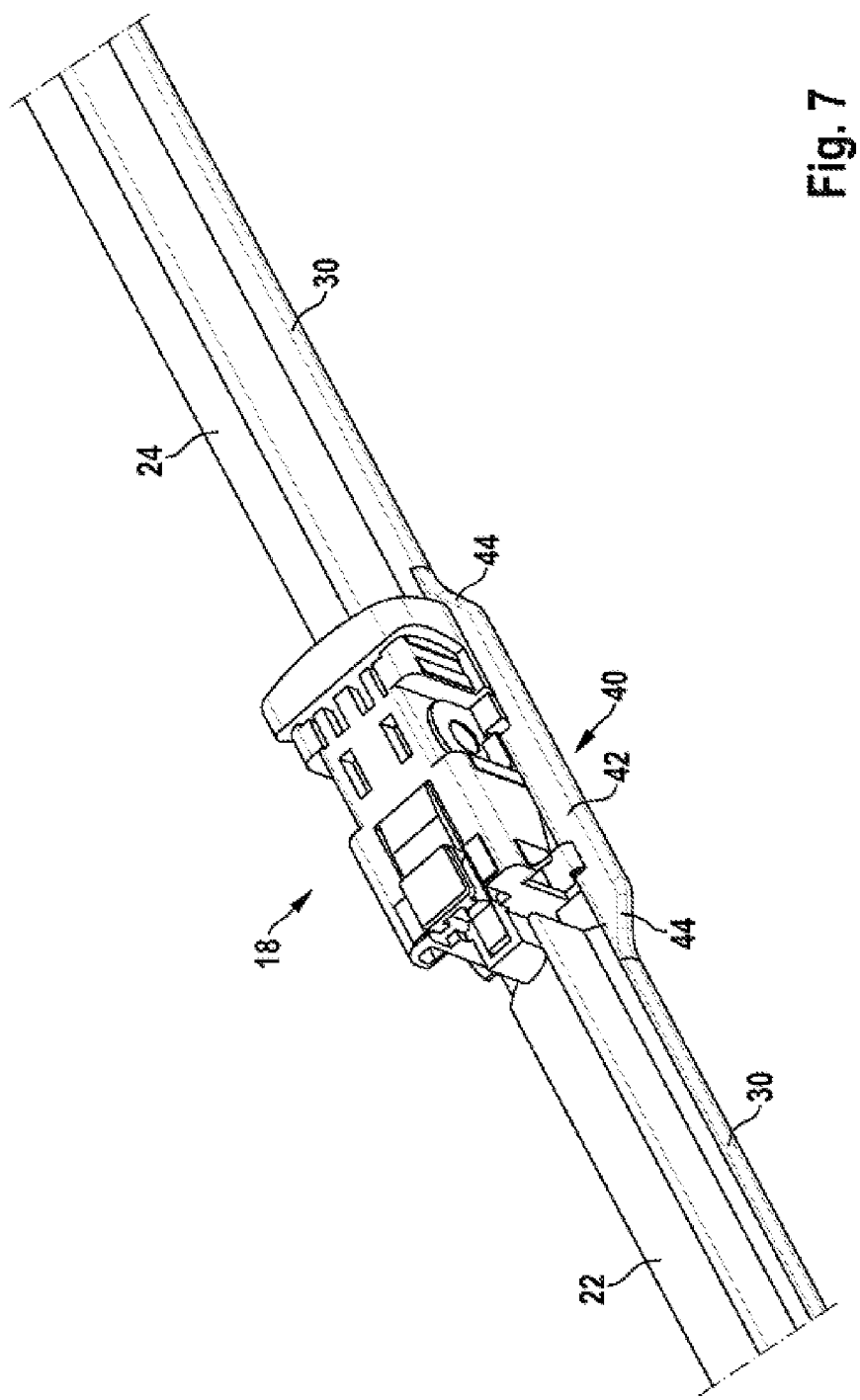
FIG. 7 shows a further variant in relation to FIG. 2, FIG. 8 and FIG. 9 show perspective partial views in the region of an attachment element of variants as per FIG. 2.

The embodiments of FIG. 1 and FIG. 2 and FIG. 3 show in each case a guiding rib 32 only on the inner spoiler part 22, whereas the embodiments of FIGS. 4 and 5 have a corresponding guiding rib 34 on the outer spoiler part 24. It is however also possible for guiding ribs 32, 34 to be provided both on the inner spoiler part 22 and also on the outer spoiler part 24 (FIG. 6).

In many cases, it may suffice for a guiding rib 40 to be provided only in the critical region 36 of the attachment element 18, which guiding rib, in the form of a connecting piece 42, connects the inner spoiler part 22 and the outer spoiler part 24 to one another in the region of the guide profiles 30. The connecting piece 42 protrudes laterally beyond the guide profiles 30, wherein, at the ends of said connecting piece, transitions 44 are provided which ensure a harmonious attachment to the guide profiles 30. The guiding rib 40 may also be used in conjunction with the guiding ribs 32. In this case, the transitions 44 of the connecting piece 42 adjoin the outer longitudinal sides of the guiding ribs 32, 34.

Figure 8:
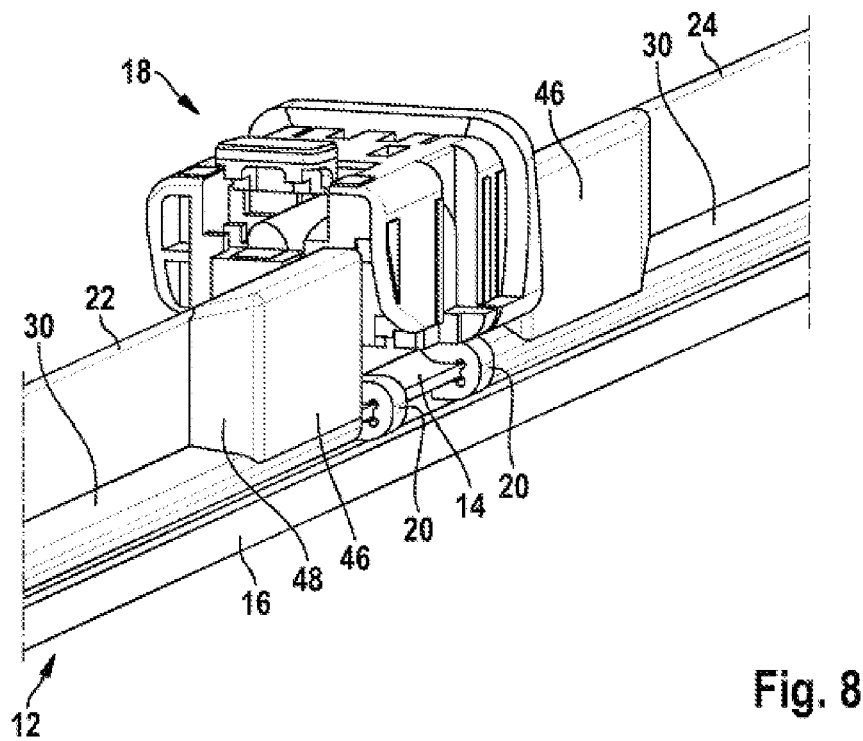

The embodiment of FIG. 8 shows a further measure for preventing the spraying of water onto the vehicle window 17 during the downward movement of the wiper blade 10, by virtue of a filler piece 46 being fastened on the flow-off side 28, above the guide profiles 30, and in front of the connecting element 18 in the longitudinal direction, which filler piece extends from the flow-off side 28 of the spoiler parts 22, 24 to the outer longitudinal sides of the guide profiles 30 or of the guide ribs 32, 34. Here, those end faces of the filler pieces 46 which point towards the ends of the wiper blade 10 form transitions 48 which fill out the dead space toward the flow-off sides of the spoiler parts 22, 24, such that no significant amount of water can collect in said region. The generation of vortices is also prevented.

Figure 9:
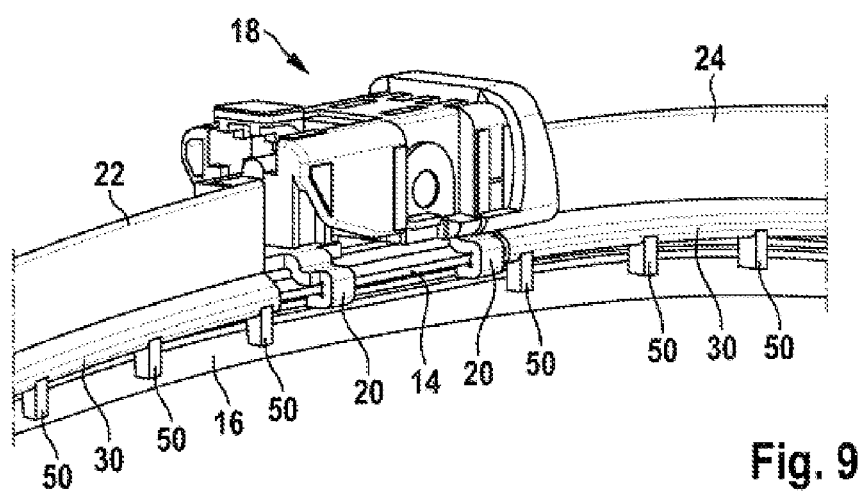

In the embodiment of FIG. 9, webs 50 are integrally formed on the guide profiles 30 on the flow-off side 28 of the spoiler parts 22, 24, which webs are arranged spaced apart from one another in the longitudinal direction of the wiper blade 10 and run perpendicular to the vehicle window 17. The number and inclination of the webs 50 may be modified depending on the application. Furthermore, the spacings between the webs 50 may be varied according to the requirements. The webs 50 may be used on their own or in conjunction with the guiding ribs 32, 34, 40.

Figure 10:
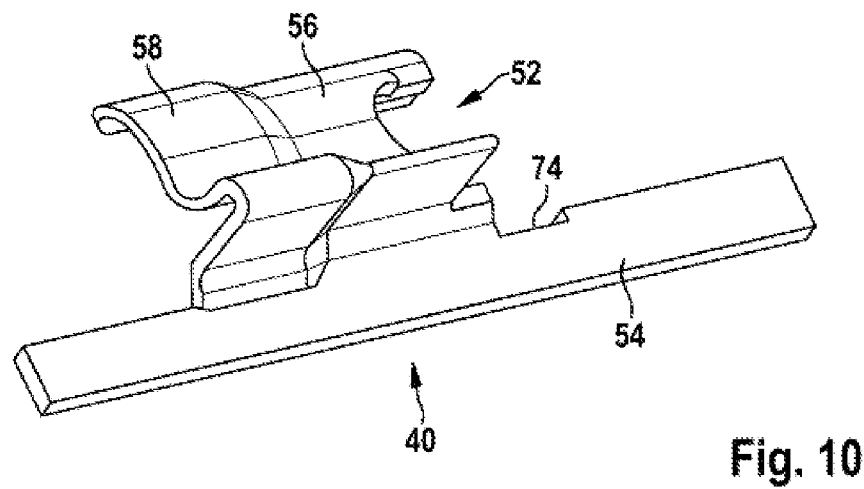
FIG. 10 shows a perspective view of a connecting piece.
Figure 11:
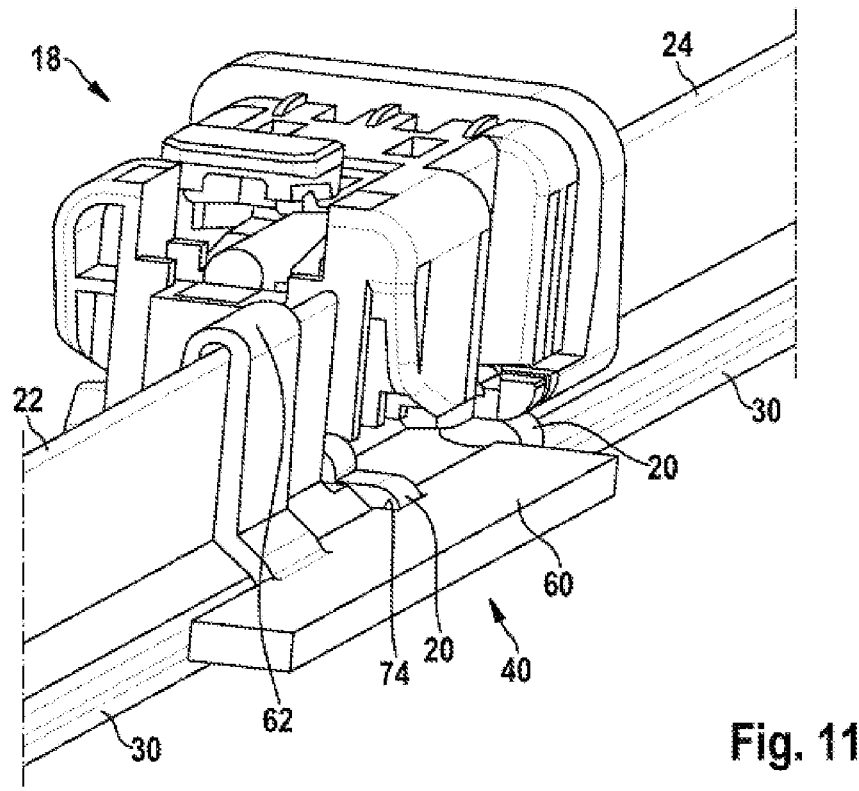
FIG. 11 shows a perspective partial view in the region of an attachment element of a variant as per FIG. 2 with a connecting strip.

The embodiment of FIG. 10 shows a guiding rib 40 in the form of a connecting strip 54 which is part of a connecting piece 52 which, by means of retention elements in the form of an attachment profile 58, is hooked onto the spoiler parts 22, 24 and adjoins the associated guide profiles 30 or the associated guiding ribs 32, 34. The connecting piece 52 also has, adjoining the attachment profile 58, a transition profile 56 to the contours of the attachment element 18. The transition profile 56 thus at least partially covers the attachment element 18. In the embodiment of FIG. 11, the guiding rib 40 is formed by a connecting strip 60 which is fastened, by way of retention elements in the form of hooks 62, to the spoiler parts 22, 24. Cutouts 74 for the claws 20 of the attachment element 18 are arranged on the inner longitudinal side of the connecting strips 54, 60.

Figure 12:
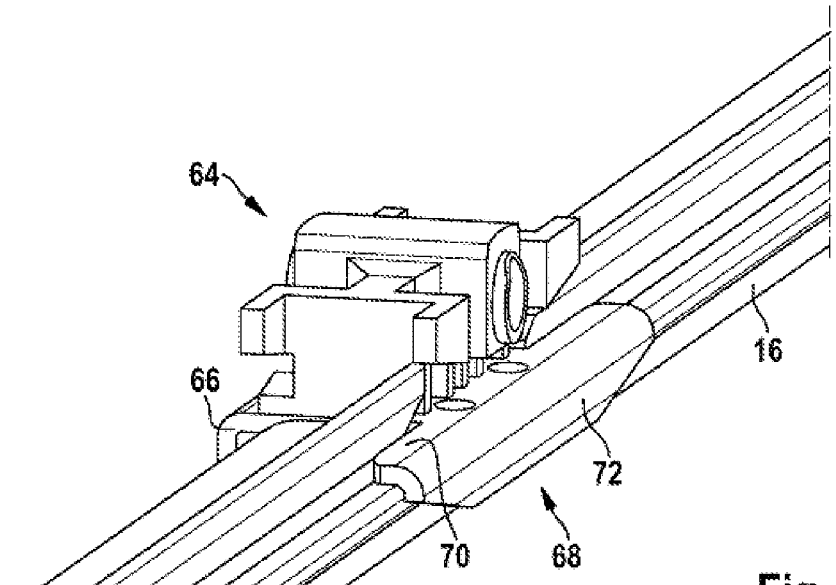
FIG. 12 shows a perspective partial view in the region of an attachment element.
Figure 13:
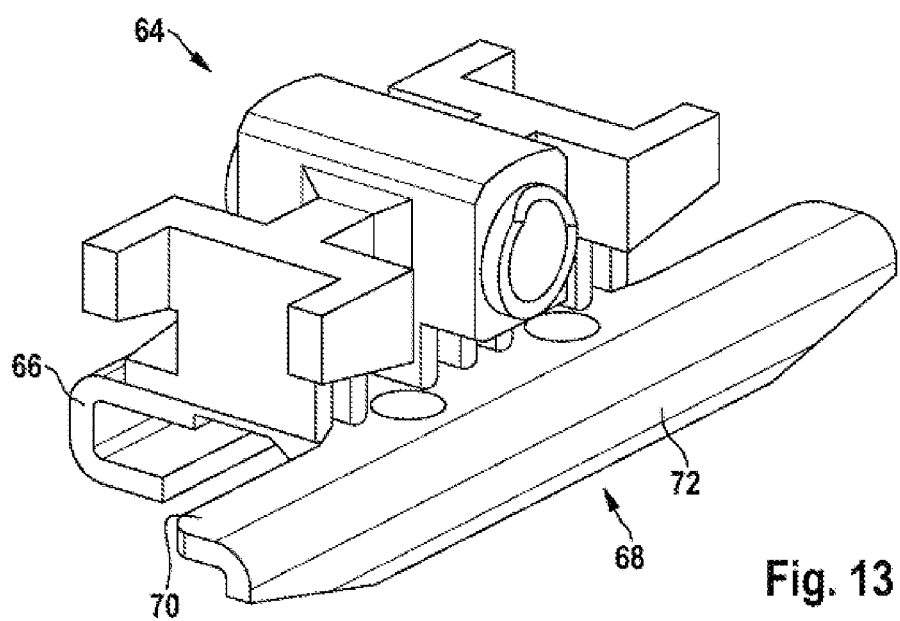
FIG. 13 shows a perspective view of the attachment element as per FIG. 12.

In the embodiment of FIGS. 12 and 13, the attachment element 64 has two guide profiles 66 and 68 by way of which it is guided on the carrier element 14. Here, the guide profile 68 on the flow-off side 28 is longer than the guide profile 66 on the flow impingement side 26. Said guide profile on the flow-off side also has a widened top wall 70, from which a skirt 72 on the outer longitudinal side runs in an angled manner toward the wiper lip 16. This likewise prevents accumulated water from being deposited as a fine spray jet onto the vehicle window. The attachment element 64 may—like the connecting piece 52—have attachment profiles 58 which are integrally formed on the guide profiles 66, 68 in the end regions of said guide profiles. In order that the skirt 72 does not impact against the vehicle window during a pivoting movement during operation, said skirt is chamfered in the region of its ends in the longitudinal direction.

What is claimed is:

1. A wiper blade (10) of flat bar construction, having a wiper strip (12) which is held by a band-like, resiliently elastic carrier element (14) which is pre-curved in a concave manner with respect to a wiper lip (16) of the wiper strip (12), wherein one or more spoiler parts (22, 23) are mounted by means of guide profiles (30) on a side of the carrier element (14) which faces away from the wiper lip (16), which spoiler parts enclose the carrier element (14) from outer longitudinal sides and protrude to a small extent beyond a flow-off side (26) of the spoiler part (22, 23) and form, with said flow-off side, a fillet (31), and wherein an attachment element (18, 64) for the articulated connection of a wiper arm is fastened in a central region of the wiper blade (10), characterized in that the guide profile (30) on the flow-off side (28) has a guiding rib (32, 34, 40) that is a thin piece that projects laterally outwardly from a remainder of the guide profile (30) along a plane that is coplanar with the carrier element (14), and wherein the guiding rib (32, 34, 40) terminates at a laterally outward end.

2. The wiper blade (10) as claimed in claim 1, including two spoiler parts (22, 24), of which an inner spoiler part (22) extends from an inner end of the wiper blade (10) to the attachment element (18, 64) whereas an outer spoiler part (24) extends from an outer end of the wiper blade (10) to the attachment element (18, 64), wherein one or both spoiler parts (22, 24) has a guide profile (30) with a guiding rib (32 or 34 respectively).

3. The wiper blade (10) as claimed in claim 1, characterized in that, in a region (36) extending over the attachment element (18), a connecting piece (52) forms, by way of a connecting strip (54, 60), a guiding rib (40) which, in a longitudinal direction to both sides of the attachment element (18), and by way of retention elements (58, 62), is hooked onto the one or more spoiler parts (22, 24) and adjoins the associated guide profiles (30) or the guiding ribs (34, 36) of the guide profiles (30).

4. The wiper blade (10) as claimed in claim 3, characterized in that the retention elements are in the form of attachment profiles (58) for the adjoining spoiler parts (22, 24).

5. The wiper blade (10) as claimed in claim 4, characterized in that the attachment profiles (58) form, with transition profiles (56) and the connecting strip (54), a connecting piece (52) which at least partially covers the attachment element (18).

6. The wiper blade (10) as claimed in claim 1, characterized in that top sides of the guiding ribs (32, 34, 40) terminate flush with top sides of the guide profiles (30).

7. The wiper blade (10) as claimed in claim 1, wherein the guide profile (30) extends laterally outwardly farther along the flow-off side (28) than along an opposite, flow-impingement side (26).

8. The wiper blade (10) as claimed in claim 1, wherein the carrier element (14) is an elongated element that extends in an elongate direction along an axis, and wherein the plane includes the axis.

9. A wiper blade (10) of flat bar construction, having a wiper strip (12) which is held by a band-like, resiliently elastic carrier element (14) which is pre-curved in a concave manner with respect to a wiper lip (16) of the wiper strip (12), wherein one or more spoiler parts (22, 23) are mounted by means of guide profiles (30) on a side of the carrier element (14) which faces away from the wiper lip (16), which spoiler parts enclose the carrier element (14) from outer longitudinal sides and protrude to a small extent beyond a flow-off side (26) of the spoiler part (22, 23) and form, with said flow-off side, a fillet (31), wherein an attachment element (18, 64) for the articulated connection of a wiper arm is fastened in a central region of the wiper blade (10), characterized in that the guide profile (30) on the flow-off side (28) has, on an outwardly pointing longitudinal side of the guide profile, a guiding rib (32, 34, 40), and wherein, in a region (36) extending over the attachment element (18), a connecting piece (52) forms, by way of a connecting strip (54, 60), a guiding rib (40) which, in a longitudinal direction to both sides of the attachment element (18), and by way of retention elements (58, 62), is hooked onto the one or more spoiler parts (22, 24) and adjoins the associated guide profiles (30) or the guiding ribs (34, 36) of the guide profiles (30).

10. The wiper blade (10) as claimed in claim 9, wherein the retention elements are in the form of attachment profiles (58) for the adjoining spoiler parts (22, 24).

11. The wiper blade (10) as claimed in claim 10, wherein the attachment profiles (58) form, with transition profiles (56) and the connecting strip (54), a connecting piece (52) which at least partially covers the attachment element (18).

12. The wiper blade (10) as claimed in claim 9, including two spoiler parts (22, 24), of which an inner spoiler part (22) extends from an inner end of the wiper blade (10) to the attachment element (18, 64) whereas an outer spoiler part (24) extends from an outer end of the wiper blade (10) to the attachment element (18, 64), wherein one or both spoiler parts (22, 24) has a guide profile (30) with a guiding rib (32 or 34 respectively).

13. The wiper blade (10) as claimed in claim 9, wherein top sides of the guiding ribs (32, 34, 40) terminate flush with top sides of the guide profiles (30).

* * * * *